United States Patent [19] [11] Patent Number: 4,752,921
Kühn [45] Date of Patent: Jun. 21, 1988

[54] RECORD PLAYER WITH MEANS FOR CAPTURING RECORDING AND SCANNING ANGLE

[75] Inventor: Hans-Robert Kühn, St. Georgen, Fed. Rep. of Germany

[73] Assignee: Deutsche Thomson-Brandt GmbH, Villingen-Schwenningen, Fed. Rep. of Germany

[21] Appl. No.: 797,242

[22] Filed: Nov. 12, 1985

[30] Foreign Application Priority Data

Nov. 9, 1984 [DE] Fed. Rep. of Germany ....... 3440999

[51] Int. Cl.$^4$ .......................... G11B 3/06; G11B 21/00
[52] U.S. Cl. ......................................... 369/43; 369/53; 369/55; 369/128; 369/233
[58] Field of Search ................... 369/43, 53, 55, 128, 369/215, 218, 233

[56] References Cited

U.S. PATENT DOCUMENTS

3,830,505  8/1974  Rabinow .......................... 369/218
4,138,121  2/1979  Nakajima et al. ................ 369/233
4,170,360 10/1979  Ohsawa ............................ 369/233

Primary Examiner—Donald McElheny, Jr.
Attorney, Agent, or Firm—Horst M. Kasper

[57] ABSTRACT

A record player with a scanner for record disks is provided, where the vertical recording track angle $\alpha$ is to be placed within predetermined limits, but where, in general, the value of $\alpha$ is not known. The scanner comprises a transducer which generates useful signals and which is provided with elastically supported and therefore movable scanning elements. According to the invention, means are provided for determining the difference $\alpha - \beta$ of the recording track angle $\alpha$ and of the tracking track angle $\beta$. The angle difference determining means generate a voltage which depends on the longitudinal motion of the scanning elements moved during the useful modulation and which is displayed and/or employed for correcting the track angle. A record player with a tracking sound pick-up arm for the tracking of record disks is provided. Means for tracking a groove on a side of a record disk are disposed elastically supported and thus movable on the sound pick-up arm. A first transducer is disposed on the tone arm for generating useful signals. A second transducer is provided for transducing of the voltage generated by detection of a longitudinal motion of the scanner.

20 Claims, 9 Drawing Sheets

RECORD PLAYER WITH MEANS FOR CAPTURING RECORDING AND SCANNING ANGLE

BACKGROUND OF THE INVENTION

1. Field of the Invention

The present invention relates to a record player with a radially or tangentially scanning tone arm for the scanning of sound record disks, where the vertical recording track angle $\alpha$ is to be maintained within predetermined limits, but where the absolute value of the recording track angle is unknown and where the tone arm is provided with a scanning system including a converter, which comprises elastically supported and therefore movable scanning elements for the generation of useful signals.

2. Brief Description of the Background of the Invention Including Prior Art

It is known that cutting systems and scanning systems employed in the recording and the reproduction of sound records have to maintain in each case certain angle tolerances with respect to the vertical track angle in order that a flawless and faultless music transmission is assured. It has been internationally agreed that the track angle for the sound recording cutter $\alpha$ is equal to 20 degrees minus 0 degrees plus 5 degrees and that the track angle for the scanner $\beta$ is equal to 20 degrees plus/minus 5 degrees.

In fact, in many cases the scanning track angle region is surpassed substantially in part as can be proved. The larger the difference between the track angles of the recording and of the scanning, the larger also are the nonlinear distortions during reproduction. While the scanning track angle $\beta$ can be determined by anyone at any time with a correspondingly calibrated and standardized test record disk, it is, on the other hand, completely impossible to state anything about which recording angle $\alpha$ is present on any arbitrary music sound recording. For this reason, it is not possible to provide in each individual case coincidence and matching of these two track angles.

Figure 1:
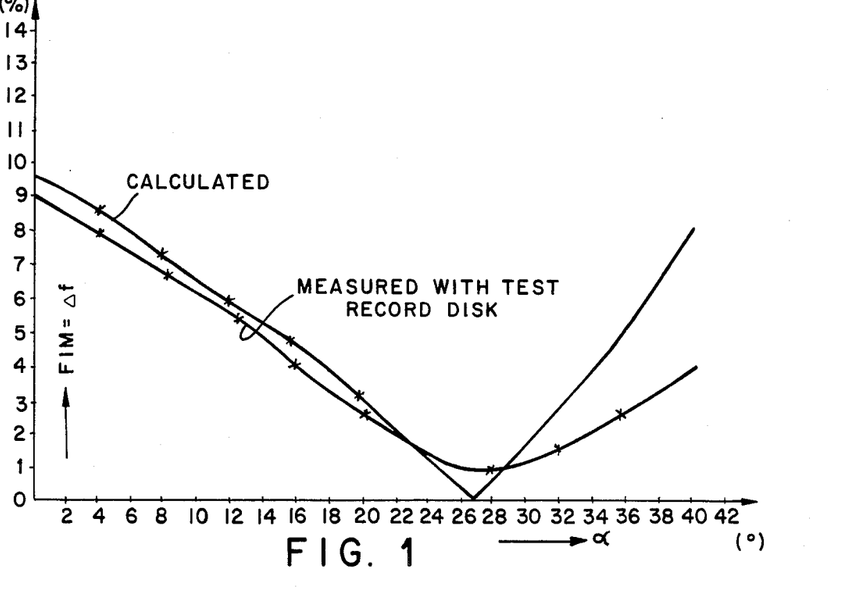
FIG. 1 is a schematic view of a diagram illustrating the dependence of the frequency intermodulation (nonlinear distortions) on the recording track angle $\alpha$ at a scanner track angle $\beta$ of 28 degrees as provided in the state of the art.
Figure 2:
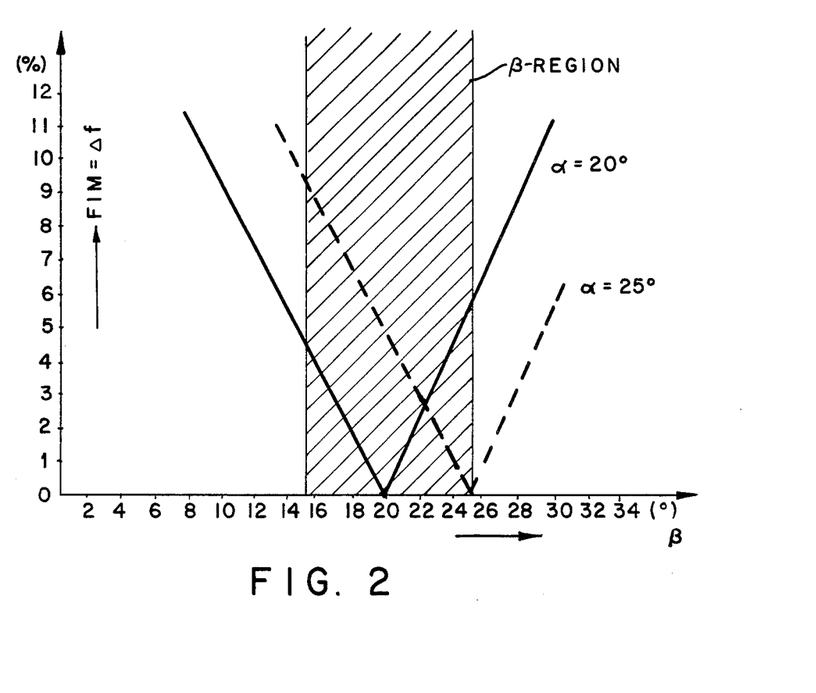
FIG. 2 is a schematic view of a diagram illustrating the dependence of the frequency intermodulation on the two track angles as used in the state of the art.

The dependence of the nonlinear distortions, called FIM=Frequency Intermodulation, on the recording track angle for a scanning system with the vertical scanning angle $\beta$ is illustrated in FIG. 1. Under these circumstances, an amount of frequency intermodulation of about 2.5% would occur for the scanning of sound records which were recorded with an angle $\alpha=20$ degrees. The frequency intermodulation situation is illustrated in FIG. 2 at a predetermined recording track angle $\alpha=20$ degrees or, respectively, $\alpha=25$ degrees. The tolerance region of the scanning track angle $\beta$ can be seen in the hatched region. For example, it can be concluded from this representation that in the case of actually available values, the frequency intermodulation increases to 10.3% if a scanning track angle $\beta=15$ degrees is present and where a sound record is scanned with the recording track angle $\alpha=25$ degrees. However, this is an unacceptable deterioration of the reproduction quality. It is further known from the state of the art that scanning systems or tone arms can be produced which are adjustable in vertical direction in order to allow the adjustment by the operator for a correction of the vertical scanning track angle $\beta$ as is taught in the German Patent DE-PF 220 2880.

However, it is disadvantageous in this context that the track angle $\alpha$ recorded in each case of the sound record remains unknown and thus the optimal arrangement of the scanner can at best be found by chance.

SUMMARY OF THE INVENTION

1. Purposes of the Invention

It is an object of the present invention to provide for a setting possibility of the vertical scanning track angle $\beta$ in consideration of the recording track angle $\alpha$ of the sound record at the record player.

It is another object of the present invention to provide for a separation of the useful signal voltage and of the longitudinal motion voltage occurring in the pick-up stylus.

It is yet a further object of the present invention to remove fluctuating modulation from a signal conresponding to a longitudinal motion in order to determine with certainty a coincidence between the recording track angle and the scanning track angle.

These and other objects and advantages of the present invention will become evident from the description which follows.

2. Brief Description of the Invention

The present invention provides a record player with a scanning sound pick-up arm for the scanning of record disks where the vertical recorded track angle $\alpha$ is within predetermined values and there is no requirement that the absolute value of the vertical recorded track angle be known. Means for scanning a groove on a side of a record disk are disposed elastically supported and thus movable on the sound pick-up arm. There is provided means for determining the difference $\alpha-\beta$ of recording track angle $\alpha$ and scanning track angle $\beta$ and generating a voltage depending on the longitudinal motion of the scanning elements moved during useful signal modulation. A first converter is disposed on the tone arm for generating useful signals.

Means for displaying the difference $\alpha-\beta$ can be provided, as can means for correcting the scanning track angle.

The sound pick-up arm can operate as a tangential or a radial scanner.

A second converter, which can operate according to an electromagnetic or a piezoelectric principle, can be provided for transducing of a voltage generated by detection of a longitudinal motion of the means for scanning.

The second converter, whose operation depends on amplitudes, can be employed for generating longitudinal motion signals. This second converter can further comprise rectifying means for separating the direct current part of a generated longitudinal motion signal voltage, where the direct current part is employed as a measure of the effectively acting stylus force of the means for scanning, since a small component of the vertically acting stylus force of the means for scanning operates in longitudinal direction as a static force component and thus provides a value representing a voltage depending on the stylus force.

Each converter can be an electromagnetically operating converter, and the record player can further comprise an about equalized pair of coils for each channel, a center tap at the coils which is led outwards and a phase coordinating switching means for separating of the useful signal voltages from the voltage generating by the motion in longitudinal direction.

The record player can be further provided with an electronic processing circuit connected to the first converter and to the means for determining the difference $\alpha-\beta$. The electronic processing circuit can provide a uniform processing of the useful signal voltage and of the longitudinal motion voltage for providing an averaged display of the three states $\alpha<\beta$, $\alpha=\beta$, and $\alpha>\beta$. Filter band pass means for about medium frequencies can be connected to an output of the electronic processing circuit. An analog to digital converter can be provided for converting an output of the filter band pass means into digital signals, A gate having an output and connected to the analog to digital converter can be provided for combining output signals from the analog to digital converter corresponding to the useful signal voltage and to the longitudinal motion voltage, where different signal levels result depending on the angle difference $\alpha-\beta$. An integrating circuit means can be connected to the output of the gate for receiving the signals with different signal levels for removing strongly fluctuating modulation frequencies in order to clearly emphasize the phase jump for the criterion $\alpha=\beta$.

There can be provided a filter band pass means adapted for about medium frequencies, which is connected to the means for scanning with its output connected to a analog to digital converter means for converting signals to digital signals in order to achieve an independence from the modulation amplitudes by employing a similar processing of the useful signal voltage and of the longitudinal motion voltage such that even if there occur interval passages of the useful signal where the voltage at the useful coil $U_S$ is equal to zero, a stabilized display of the three states $\alpha<\beta$, $\alpha=\beta$, and $\alpha>\beta$ is provided. A gate can be connected to the output of the analog to digital converter means for providing different signal levels depending on the angle difference $\alpha-\beta$. The output of the gate can be connected to a hold circuit which has an output connected to an integrating circuit section for removing fluctuating modulations in order to clearly indicate the phase jump for the criterion $\alpha=\beta$.

Another aspect of the present invention provides a method for the scanning of sound signals on a record disk with a radially or tangentially sensing tone arm which comprises the following:

The difference $\alpha-\beta$ of recording track angle $\alpha$ and scanning track angle $\beta$ is determined, where the vertical recording track angle $\alpha$ is to be maintained within predetermined limits, but, however, the absolute value of $\alpha$ is in general unknown.

A signal voltage, which depends on the longitudinal motion of scanning elements moved during useful modulation, is generated because the sound pick-up arm includes a scanning system with a mechano-electrical converter and elastically supported and thus movable scanning elements for the generation of useful signal voltages. The signal voltage is employed to enable a correction of the angle.

The useful signal voltage and the longitudinal motion voltage can be uniformly processed in an electronic processing circuit connected to the first converter and to the means for determining the difference $\alpha-\beta$ for providing an averaged display of the three states $\alpha<\beta$, $\alpha=\beta$, and $\alpha>\beta$. An output of the electronic processing circuit can be connected to a band pass means for about medium frequencies for filtering the output of the electronic processing circuit. An output of the filter band pass means can be converted into digital signals in an analog to digital converter. Output signals from the analog to digital converter corresponding to the useful signal voltage and to the longitudinal motion voltage can be combined in a gate and connected to the analog to digital converter, where different signal levels result depending on the angle difference $\alpha-\beta$. The signals with different signal levels can be integrated in an integrating circuit means connected to the output of the gate for removing strongly fluctuating modulation frequencies in order to clearly emphasize the phase jump for the criterion $\alpha=\beta$.

It has been found that the difference of the angle $\alpha-\beta$ can be determined from a small longitudinal motion of the elastically supported and thus movable scanning elements. The difference can be employed for the adjustment of the scanning track angle $\beta$ such that the amount $\alpha-\beta=0$ results as an optimum operating point with respect to a minimum frequency intermodulation. By having a converter generating a voltage from the longitudinal motion, it is possible with corresponding electronic means to display the difference $\alpha-\beta$ and thus to adjust the angle to the optimum value $\alpha-\beta=0$.

In addition, it has been shown to be advantageous that a static force component is present in the longitudinal direction, which depends on the scanner stylus force and which can be employed for a display of the stylus force.

Furthermore, it has been found that, between the state $\alpha<\beta$ and the state $\beta<\alpha$, the signal component of longitudinal voltage passes through a phase jump which characterizes the state $\alpha=\beta$. This now allows the exact identification of $\alpha=\beta$. The advantage of this is that dependence on the modulation amplitudes no longer exists.

According to a specific embodiment of the present invention, this can be achieved and can be employed for an averaged display by processing both the useful signal voltage as well as the longitudinal motion voltage through a filter band pass for medium frequencies, followed by means for digitizing such as for example, a Schmidt-Trigger. Thus a successive EXCLUSIVE OR Exor-gate can provide a combination of the signals. Depending on the angle difference $\alpha-\beta$, advantageously there are generated different signal levels at the output at the EXCLUSIVE OR Exor-gate. A following intergrating section can stabilize the strongly fluctuating, modulation frequencies dependent display to the point $\alpha=\beta$.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

The present invention relates to a record player with a radially or a tangentially scanning sound pick-up arm for scanning of sound record disks, where the vertical recording track angle $\alpha$ is to be maintained within predetermined limits, but where the absolute value of the angle is in general unknown. The sound pick-up arm is provided with a scanning system with a converter which includes elastically supported and therefore movable scanning parts. There are provided means for determining the difference $\alpha - \beta$ of recording track angle $\alpha$ and of scanning track angle $\beta$. The angle difference determining means generates a voltage depending on the longitudinal motion of scanning elements moving under the useful signal modulation, and this voltage is displayed and/or a track angle correction is provided.

In addition to the converter for the useful signals in the scanning system, there is provided a converter for the detection of a voltage generated by the longitudinal motion of the stylus, which converter preferably operates according to an electromagnetic or piezo-electric principle.

An amplitude dependent operating converter can be employed for the generation of a longitudinal motion signal. The direct current part of the generated longitudinal motion voltage can be used as measure for the effectively operating stylus force of the scanner. This is possible because a small component of the vertically operating stylus force of the scanner is acting longitudinally as a static force component and thus a value is available which presents a voltage depending on the stylus force.

If an electromagnetic scanning converter which is provided with an about equal coil pair for each channel is used, there can be at least one middle tap which is led out and which effects a separation of the useful signal voltages from the voltage generated by the longitudinal motion based on a corresponding proper phase combination.

In order to achieve independence from the modulation amplitudes and in order to stabilize the display of the three states $\alpha < \beta$, $\alpha = \beta$ and $\alpha > \beta$, a uniform processing of the useful signal voltage and of the longitudinal motion voltage can be employed. Digital signals are generated via a filter band pass means for about middle frequencies and then means are provided for digitizing the incoming signals. The digitized signals are combined with a gate and depending on the angle difference $\alpha - \beta$, different signal levels are generated. These signals are freed from heavily fluctuating modulation frequencies via a following integrating section in order to allow the recognition of the phase jump for the criterion $\alpha = \beta$.

To achieve independence from the modulation amplitudes even in the case of interval passages of the useful signal at a voltage of the useful coil $U_S = 0$ and to obtain a stabilized display of the three states $\alpha < \beta$, $\alpha = \beta$ and $\alpha > \beta$, there can be employed an equivalent processing of the useful signal voltage and of the longitudinal motion voltage. This is obtained by employing a filter band pass means for about medium frequencies and then a means for digitizing the signal to obtain digital signals. The digital signals are combined by a gate and, depending on the angle difference $\alpha - \beta$, different signal levels are provided. These signals are freed from fluctuating modulations via a hold circuit and a following integrating section in order to make the phase jump for the criterion $\alpha = \beta$ recognizable.

In the section on the state of the art, FIGS. 1 and 2 already were referred to in order to explain the connection between the track angle and the non-linear distortions which are called FIM = frequency intermodulations.

Figures 3, 4A:
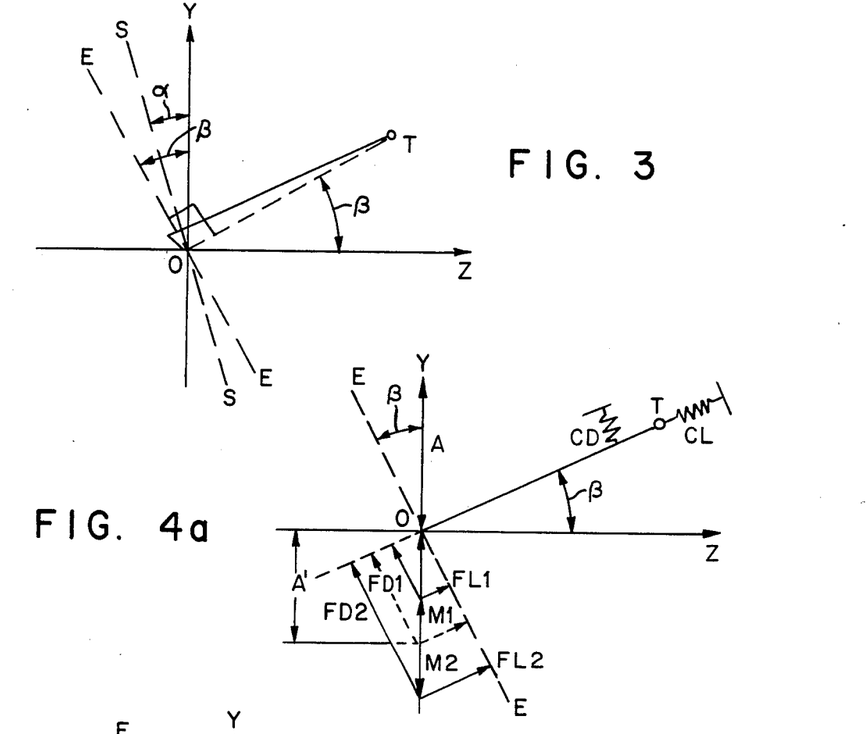
FIG. 3 is a schematic view of a diagram illustrating the dependence between the recording track angle $\alpha$ and the scanning track angle $\beta$ as employed in the state of the art.
FIG. 4a is a schematic view of the force situation at the scanner when the recording track angle $\alpha = 0$.

FIG. 3 illustrates in a side view of a scanner, the connection between the recording track angle $\alpha$ and the scanning track angle $\beta$. The axis Y is normal to the record disk plane Z and O is the scanning point. Upon motion at the scanning tip, the movable arrangement of the scanning system rotates around the point T. The angle TOZ is the vertical scanning track angle $\beta$. Its direction of motion E—E is perpendicular to OT. The recording direction S—S can deviate from the direction of motion E—E by the angle $\alpha - \beta$. This is then the cause of substantially stronger nonlinear distortions called frequency intermodulations as can be recognized from FIGS. 1 and 2.

It is also part of the state of the art to know how the scanner force relations cooperate. This has been illustrated in FIGS. 4a and 4b. FIG. 4a shows the case $\alpha=0$. The schematically illustrated elasticity CO represents the required restoring force of one of the two stereo channels or it can be taken as the resulting effective elasticity for the rotary motion. Another elasticity CL acts in the direction of the axis OT, that is, corresponding to the direction of the longitudinal motion. The tip of the stylus of the scanning system is resting with a stylus force A in the groove of the record disk at the point O. The counterforce A', which has to be exerted by the wall of the groove, results in a force component FD directed along the line E—E, which effects the rotation of the converter axis OT around T. Here the converter is to be thought to be disposed at the point T. A component FL is directed in the direction of the axis OT. A static shifting of the point T versus the converter or scanning casing can result due to the elasticity CL, where the elasticities CD and CL are supported against the casing. If now there is assumed a deflection simultaneously in the Y direction of the scanning point caused by the modulation M1 or, respectively, M2 of the sound record disk, then there results a corresponding change of the FL component (FL1 or, respectively, FL2) as can be recognized from FIG. 4a. A modulation component in the axial direction OT is superimposed on the static displacement of the support point T. The size of this modulation component depends on the angle $\beta$.

Figure 4B:
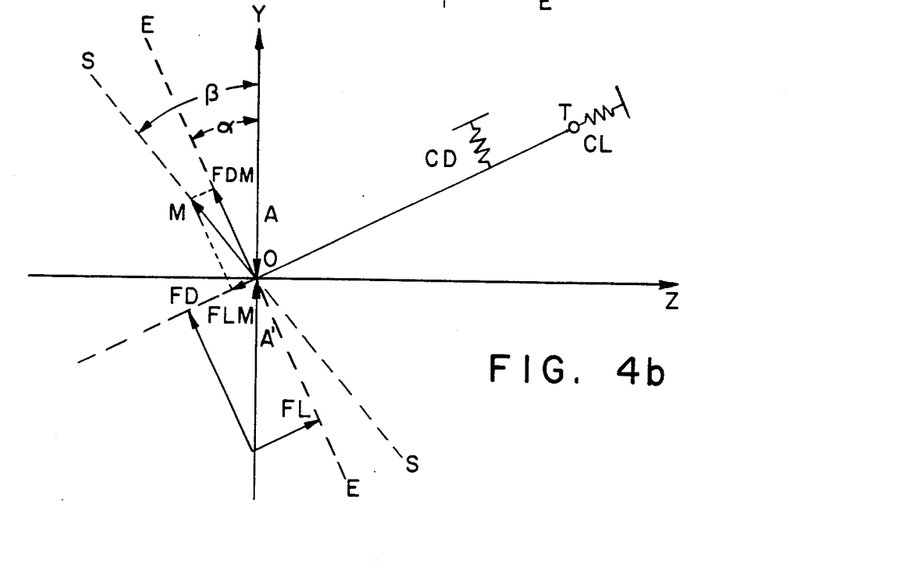
FIG. 4b is a view similar to that of FIG. 4a with a finite recording track angle $\alpha$ as occurs according to the state of the art.

The modulation as recited coincides with the Y direction according to the example of FIG. 4a. However, this is only the case if $\alpha=0$. However, in view of the fixed relations, this is not the case in reality. FIG. 4b therefore shows the arrangement where the modulation occurs with an angle $\alpha$. The resulting force component in the OT direction depends on the angle difference $\alpha-\beta$. if $\alpha-\beta=0$, then also FL=0 if one does not consider the static component FD or, respectively, FL which is caused by the counterforce A'.

Depending on the size of the elasticity CL, the point T also performs a movement in the direction OT in the case $\alpha-\beta$ not equal to 0. It is a subject matter of the invention that this motion is employed as an indicator for the desired case $\alpha--=0$. The scanning system is provided according to the invention such that the longitudinal motion of the movable scanning part is transformed into electrical signals. This can occur in principle according to all known converter methods; preferably the electromagnetic, the magnetodynamic or the piezoelectric principle are under consideration.

Figure 5:
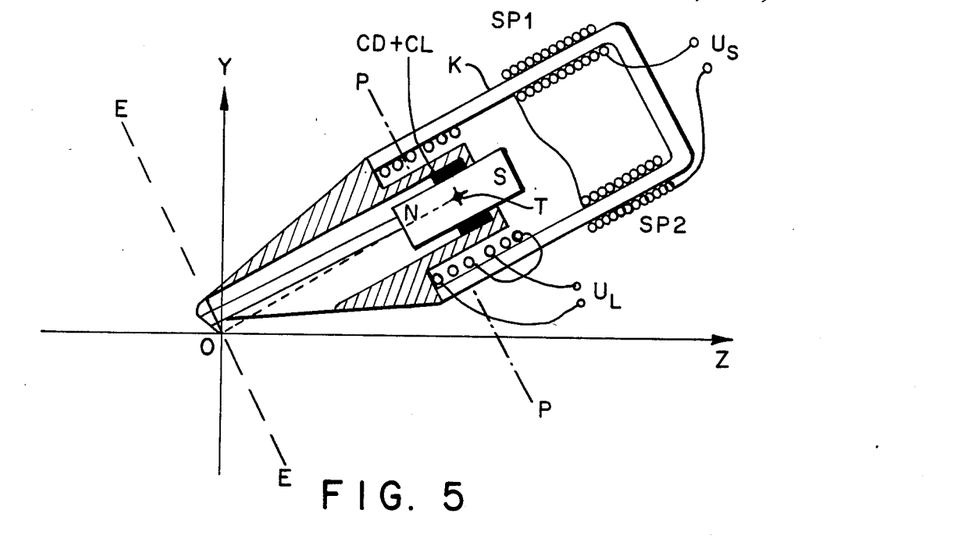
FIG. 5 is a sectional view of a simplified representation of a magnetic system as an embodiment, where the section plane is disposed vertically through an imaginary longitudinal axis.
Figure 6:
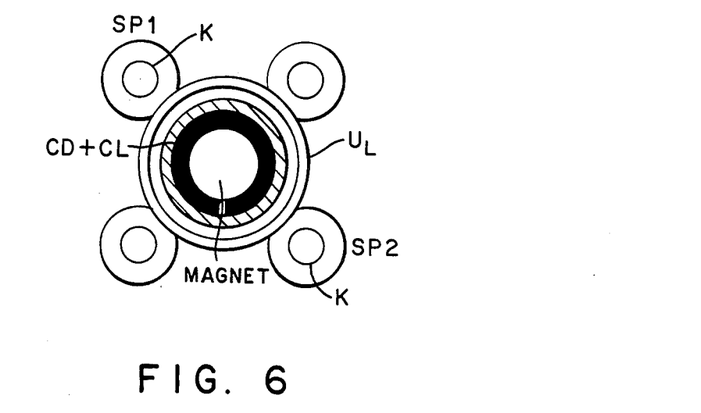
FIG. 6 is a view of a cross section of the system illustrated in FIG. 5 along the section line P-P.

FIGS. 5 and 6 show an embodiment in a simplified longitudinal or, respectively, cross-sectional representation for a single stereo channel where a magnet system is constructed with movably disposed permanent magnets. The motion at the scanning point O in the direction E—E is transformed into electrical voltages US in the magnetic circuit K and the two coils SP1 and SP2 because of the rotation around the point T. The electrical voltages, after a corresponding amplification for reproduction of the stereo channel, are fed to a loud speaker. The longitudinal components of motion in the direction of OT induce in the additional fixed coil corresponding voltages UL and give an indication of the relation of the angles $\alpha-\beta$. It is emphasized again under reference to FIG. 3 that the recording direction S—S coincides with the direction of motion E—E if $\alpha-\beta=0$.

Figure 7:
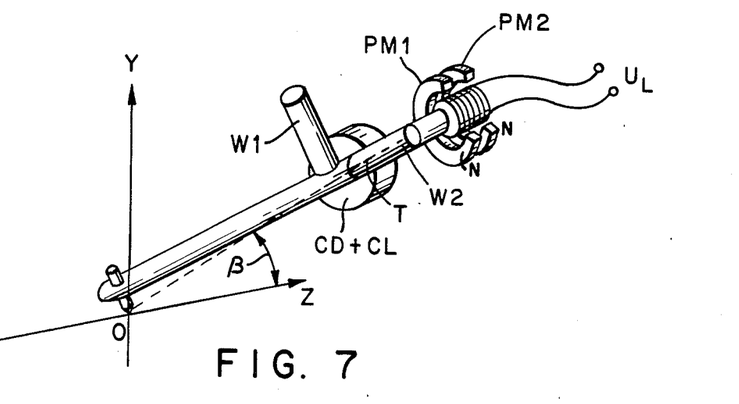
FIG. 7 is a view of a simplified spacial representation of an embodiment of a stereo scanning system with an electrodynamic converter for longitudinal motion.
Figure 8:
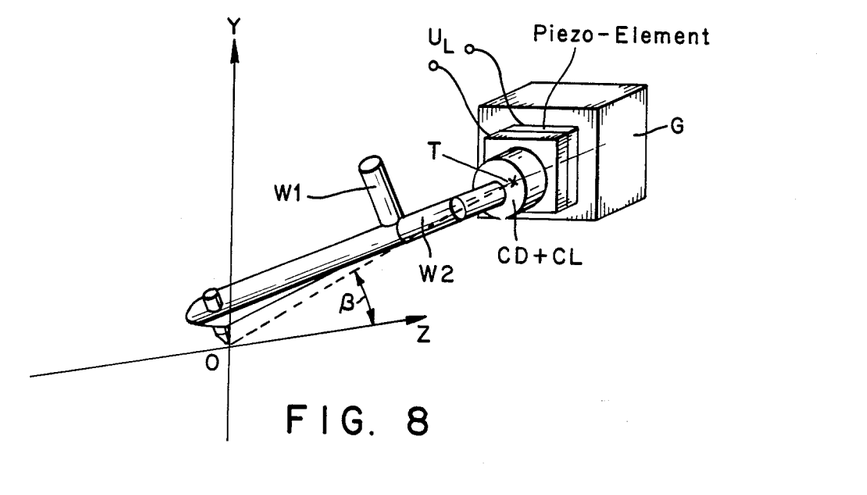
FIG. 8 is a schematic view of a simplified spacial representation of an embodiment of a stereo scanning system with a piezo-electric converter for longitudinal motion.

Further embodiments with movable scanning elements are shown without magnetic circuits in FIGS. 7 and 8. These embodiments include the converters W1 and W2 which are staggered with respect to each other by 90 degrees. For measuring the motion in the direction of motion OT, a small coil UL moving with the motion is brought between two fixed permanent magnets PM1 and PM2 as shown in FIG. 7. In FIG. 8, a piezoelectric converter is disposed between the elastic supports CD and CL and the scanning casing G. According to the two examples, FIGS. 7 and 8, voltages UL are generated depending on the longitudinal motions of the movable scanning parts.

Figure 9:
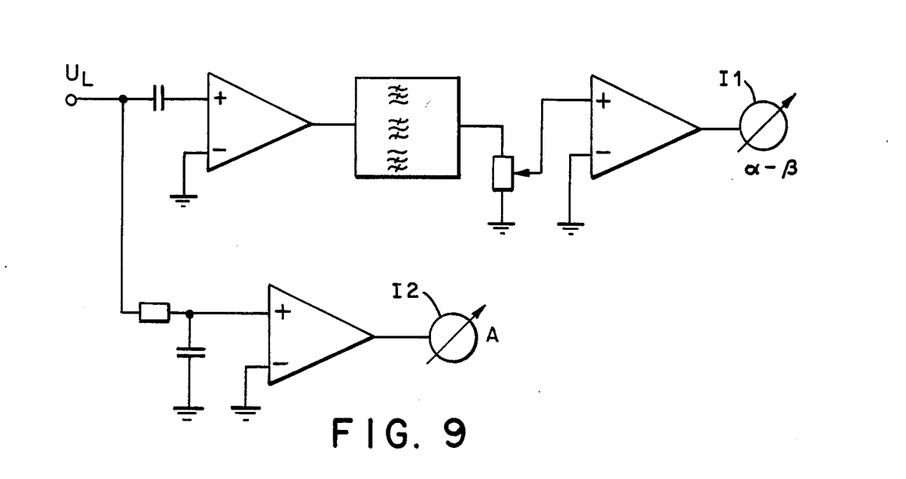
FIG. 9 is a view in principle for a circuit for displaying the vertical track angle and the stylus force.

This voltage UL can be displayed with an instrument I1 after an adjustable amplification and possibly a frequency deviation correction with an instrument I1. A corresponding circuit in principle is shown in FIG. 9. The instrument can be calibrated in angle degrees. Thereby a measure relating to the angle difference $\alpha-\beta$ is provided. The person operating the system can select for each record, based on known adjustment means for the scanning angle, the optimum angle geometry or, respectively, in case of a known scanning track angle $\beta$ of a certain scanning system, receive data concerning whether the record disk present is still disposed within the agreed tolerance for the recording track angle.

It has already been mentioned in the context of FIGS. 4a and 4b, that the stylus force delivers a static force component in the longitudinal direction. According to a further embodiment of the invention, it is therefore disclosed in the case of employment of amplitude dependent working converters, such as, for example, piezoelectric converters, to separate electronically the static component which results from the stylus force acting vertically on the scanning point O from the alternating force component in order to obtain the longitudinal deflection of the movable scanning part. This has been entered into the circuit of FIG. 9. The desired voltage is taken off at the input UL and is fed via a time delay RC-member to an operational amplifier. An instrument I2, which is connected to the output of the operation amplifier, indicates the stylus force which is, for example, calibrated in micronewtons.

According to a further embodiment of the present invention, it is disclosed to dispose a magnetic system with two conventional induction coils for each stereo channel such that the center tap of the coil pairs is led outwardly. In this way, the so-called useful signal voltage of the stereo channel can be generated as well as a voltage proportional to the longitudinal motion by employing the same coils.

Figure 10A:
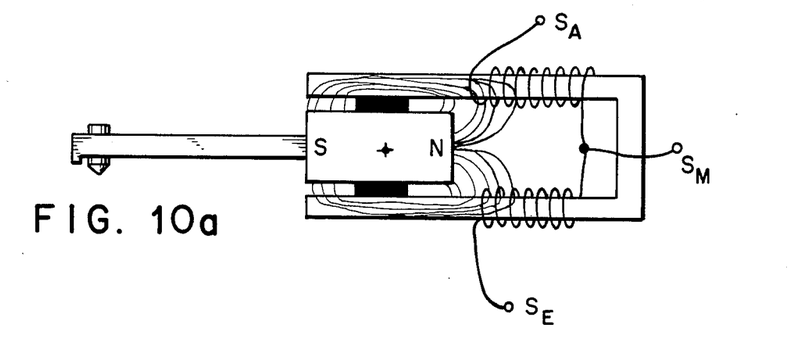
FIG. 10a is a view of a longitudinal section of a simplified magnetodynamic scanning system for explaining the mode of operation for one stereo channel.
Figure 10B:
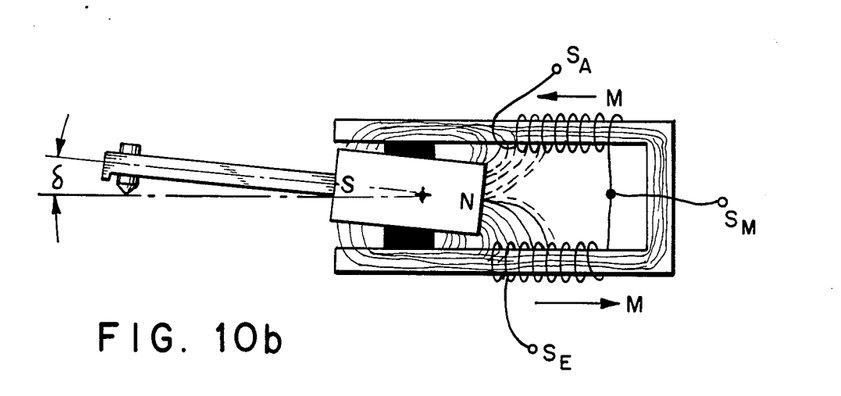
FIG. 10b is a view similar to that of FIG. 10a with an angle deflection of the scanner.
Figure 10C:
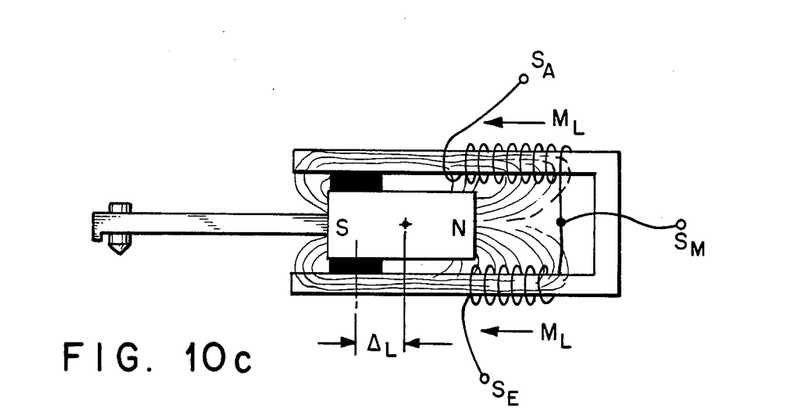
FIG. 10c is a view similar to that of FIGS. 10a and 10b with the presence of a longitudinal motion.
Figure 11A:
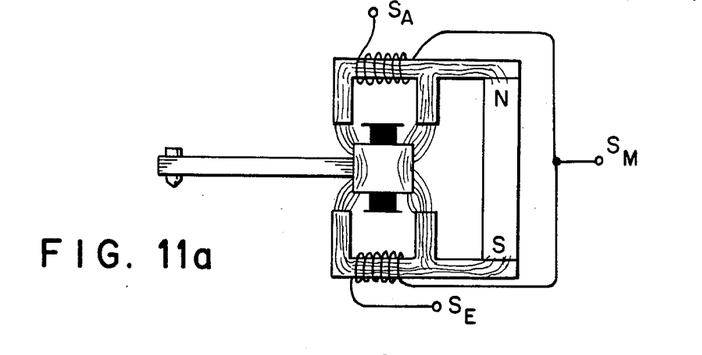
FIG. 11a is a schematic view of a longitudinal section of magnetic scanning system to explain the mode of operation.
Figure 11B:
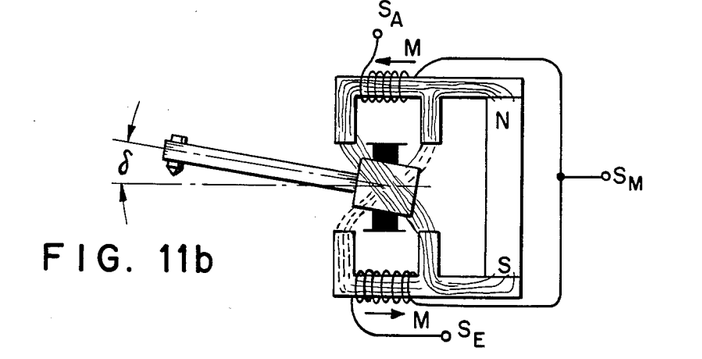
FIG. 11b is a view of the system shown in FIG. 11a with a deflection of the stylus.
Figure 11C:
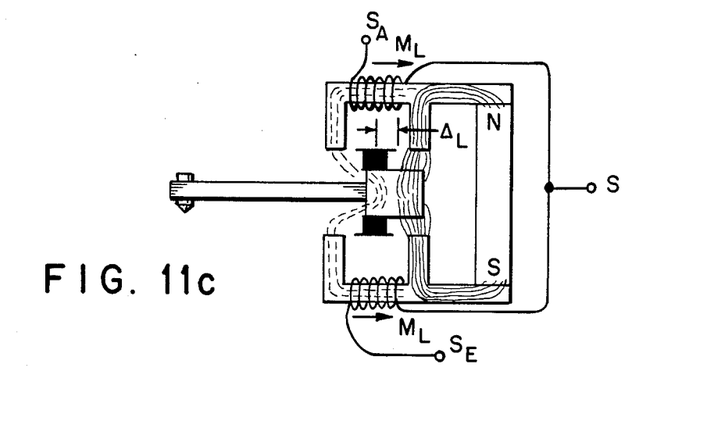
FIG. 11c is a view of the system of FIG. 11a and 11b with the presence of a longitudinal motion, Fig. 12 a is a view of a block circuit diagram for processing voltages generated according to FIGS. 10 or 11.

FIGS. 10 and 11 show two different embodiments in this regard. The mode of operation of a magnetodynamic system, that is, a system employing a moving magnet is illustrated in FIGS. 10a, 10b and 10c. In contrast, FIGS. 11a, 11b and 11c represent the mode of operation of a magnetic system, that is, a system employing a moving iron piece. In each case only the coils of one stereo channel have been shown in the drawing.

FIG. 10a illustrates the center position of the movable scanning part. The magnetic force lines in part permeate the induction coils SA/SM and SM/SE. A rotary movement at the scanning tip by an angle δ effects a change in the force flux in the two coils in the direction indicated by the letter M (Compare FIG. 10b).

If a longitudinal motion of the movable scanning part is present, for example by the amount ΔL, which is represented in an exaggerated way in FIG. 10c, then the two coils are premeated by the magnetic force flux in the same way such that ML results.

The arrangement according to FIGS. 11a, 11b and 11c works in a similar way to FIGS. 10a, 10b and 10c. The rest position of the movable scanning part can be recognized in FIG. 11a. For rotary motion by about the angle δ (FIG. 11b), opposite magnetic flux directions are generated in the two coils SA/SM and SM/SE. For longitudinal motion of about the amount ΔL (FIG. 11c), the magnetic flux directions are of the same phase. Of course, in this figure also, the motions are shown in an exaggerated way for illustration purposes.

It can be concluded from the above explanations such the useful signal voltages can be separated from the longitudinal motion voltages.

Figure 12A:
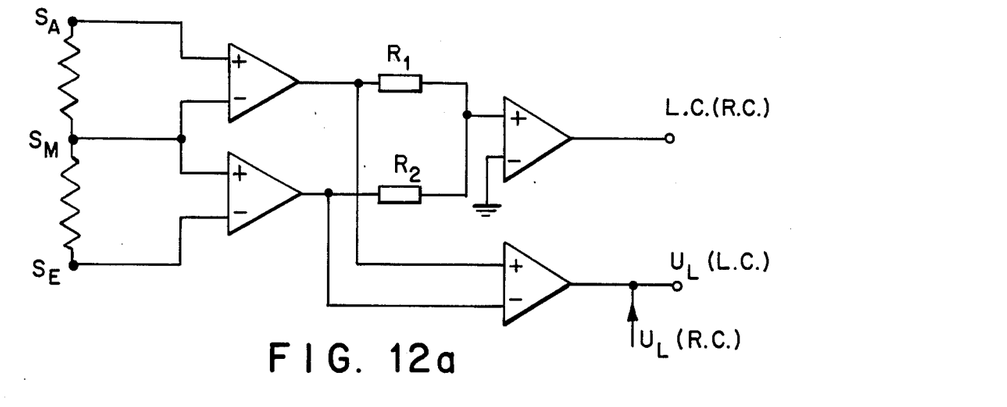
Figure 12B:
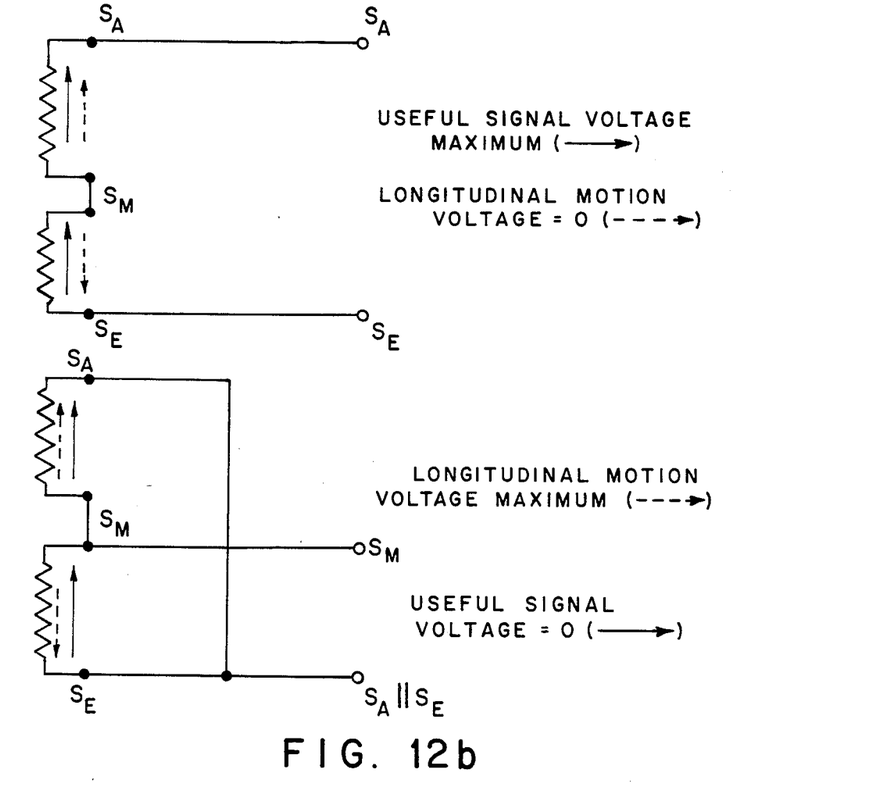
FIG. 12b is an illustration explaining the mode of operation of the coils.

If the useful signal voltage for one stereo channel is present upon series connection of the voltages SA/SM and SM/SE between SA and SE under consideration of the winding directions of the coils, then there results upon a parallel connection of the coils a voltage proportional to the longitudinal motion at the components (SE // SE) / SM. A corresponding circuit is shown in FIG. 12a. Here the voltages UL (left channel) and UL(right channel) are switched together in order to increase the sensitivity. However, in principle one of the two voltages UL would be sufficient for generating the longitudinal motion. The principle of the generation of maximum useful or, respectively, longitudinal motion voltages can be obtained from the schematic illustration of the coil circuit according to FIG. 12b.

Figure 13:
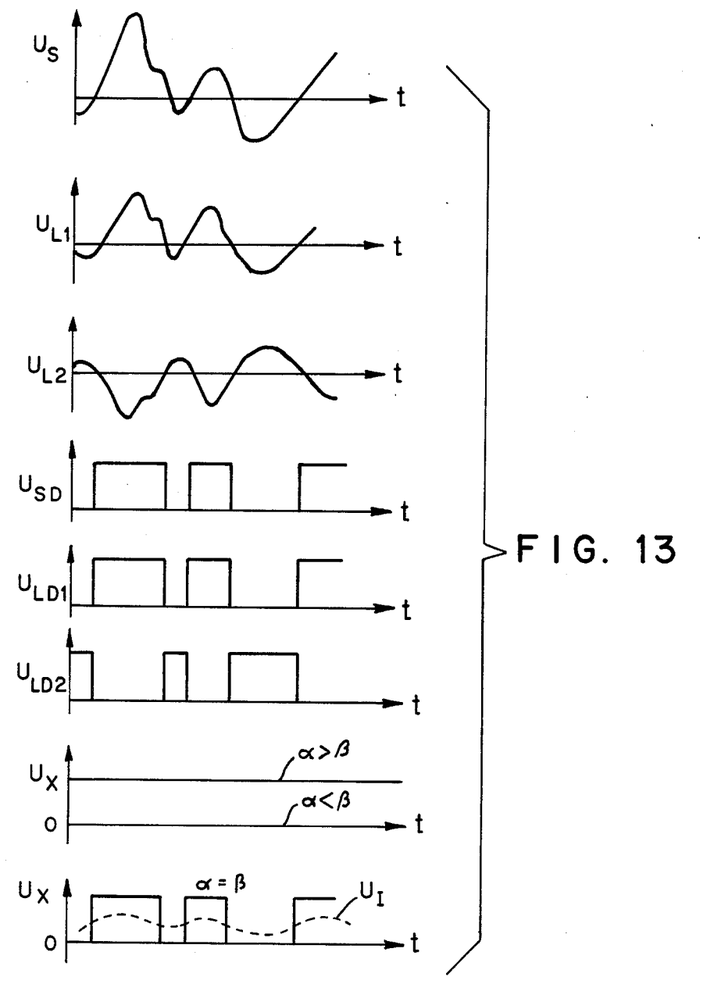
FIG. 13 is a view of the signal levels versus time of the various voltages.
Figure 14:
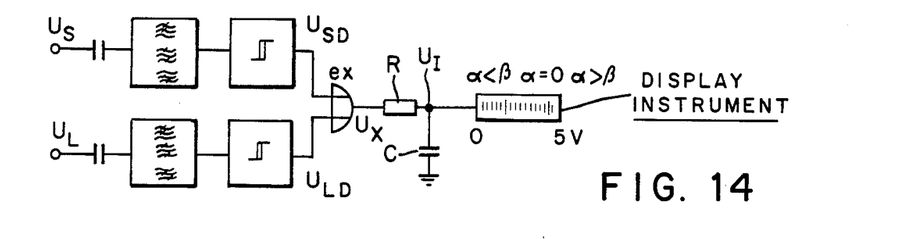
FIG. 14 is a view of a circuit diagram corresponding to the signal displayed in FIG. 13.

The above considerations have been presented for improving the display $\alpha<\beta$, $\alpha=\beta$ and $\alpha>\beta$. In particular, the display has to be averaged and stabilized substantially. This can be achieved according to a further embodiment of the invention by effecting an independence of the superposed modulation amplitudes. How this can be achieved is illustrated in FIG. 13. The recording track angle α can therefore be both larger as well as smaller than the scanning track angle β. It can be concluded from this that at the scanner the following force components act at the point O according to a parallelogram of forces:

K=Force component in longitudinal direction, directed in the direction OT or TO;
$A_M$=Modulations amplitude;
P=Force component in rotary direction They form a force parallelogram at the scanning point, which operates in a conventional way. The phase of the component K is different or shifted by 180 degrees if $\alpha>\beta$ as compared to $\beta>\alpha$, that is, the phase jump at the state $\alpha=\beta$ can be used as identification of the state $\alpha=\beta$. This has the desired advantage that a dependence on the modulation amplitudes no longer exists. Both the voltage $U_L$ corresponding to the force component K as well as the voltage $U_S$ corresponding to the force component P are digitized in suitable frequency band, for example at middle frequencies, and in fact, for example, with two Schmidt-Triggers, and they are combined via an EXCLUSIVE OR Exor-gate. Depending on the angle difference $\alpha-\beta$, different signal levels $U_X$ are generated at the output of the exor-gate. The heavily fluctuating, modulation frequencies dependent display can be stabilized substantially with a following integrating member (R,C) for the case $\alpha=\beta$. This is shown by the dashed line corresponding to the voltage $U_I$ in the lowest diagram of FIG. 13. The following voltages are entered into the diagrams of FIG. 13.

Figure 15:
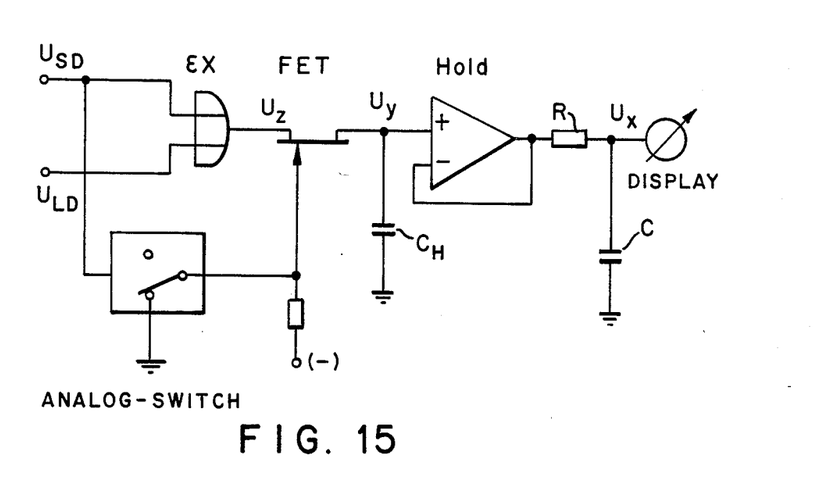
FIG. 15 is a view showing an improved circuit using a hold circuit similar to that of FIG. 14.

$U_S$=Voltage of the useful signal coil
$U_L$=Longitudinal motion voltage
$U_{L1}$=Longitudinal motion voltage if $\alpha<\beta$
$U_{L2}$=longitudinal motion voltage if $\beta<\alpha$
$U_{SD}$=Digitized voltage $U_S$
$U_{SD1}$=Digitized voltage $U_{L1}$
$U_{SD2}$=Digitized voltage $U_{L2}$
$U_X$=Output of the EXCLUSIVE OR Exor-gate
$U_I$=Voltage at the display instrument if $\alpha=\beta$ In order to effect reasonable stabilization and noise elimination in the display, the time constant of the RC-member has to be selected relatively large, if, during interval passages of the record disk, $U_S$ becomes equal to 0. According to a further embodiment of the invention, this can be realized by switching a so-called hold circuit as illustrated in FIG. 15, which hold circuit comprises an analog switch illustrated as an integrated circuit, a field effect transistor FET and a capacitor $C_H$ with an operational amplifier OP. With the use of this hold circuit, the display therefore becomes independent of interval passages with $U_S=0$ within the framework of the use modulation in the case of decreased time constant RC. In order to understand the circuit according to FIG. 15, it should be added that the field effect transistor is open during the application of a (−) voltage at its gate. Then the following table of the available states results:

| $U_{SD}$ | $U_{LD}$ | $U_Z$ | $U_Y$ | $U_X$ |
|---|---|---|---|---|
| 1 | 1 | 0 | 0 | 0 |
| 1 | 0 | 1 | 1 | 1 |
| 0 | 1 | 1 | hold | hold |
| 0 | 0 | 0 | hold | hold |

It will be understood that each of the elements described above, or two or more together, may also find a useful application in other types of means for measuring recroding and scanning angles differing from the types described above.

While the invention has been illustrated and described as embodied in the context of a record player with means for capturing recording and scanning angle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A record player with a tracking tone arm for the tracking of record disks comprising
   a tone arm;
   means for tracking a groove on a side of a record disk disposed elastically supported and thus movable on said tone arm where the predetermined vertical recorded track angles α is within predetermined values and without any requirement that the real values of the vertical recorded track angle α be known;

a first transducer disposed on the tone arm for generating useful signals and sensing the tracking motion of said means for tracking;

electronic means connected to said first transducer and receiving said useful signals from which said electronic means uses for determining the difference $\alpha-\beta$ between the predetermined recorded track angle $\alpha$ and actual tracking track angle $\beta$ depending on the longitudinal motion of said means for tracking.

2. The record player with a tracking tone arm for the tracking of record disks according to claim 1 further comprising means for displaying the difference $\alpha-\beta$ connected to said electronic means for determining the difference $\alpha-\beta$ of recording track angle $\alpha$ and tracking track angle $\beta$.

3. The record player with a tracking tone arm for the tracking of record disks according to claim 1 further comprising means for correcting the pick-up track angle $\beta$ connected to said electronic means for determining the difference $\alpha-\beta$ of recording track angle $\alpha$ and tracking track angle $\beta$.

4. The record player with a tracking tone arm for the tracking of record disks according to claim 1 wherein the tone arm operates as a tangential pick-up.

5. The record player with a tracking tone arm for the tracking of record disks according to claim 1 wherein the tone arm operates as a radial pick-up.

6. The record player with a tracking tone arm for the tracking of record disks according to claim 1 further comprising a second transducer for transducing of a voltage generated by detection of a longitudinal motion of the means for tracking and connected to the means for determining the difference $(\alpha-\beta)$.

7. The record player with a tracking tone arm for the tracking of record disks according to claim 6 wherein the second transducer operates according to an electromagnetic principle.

8. The record player with a tracking tone arm for the tracking of record disks according to claim 6 wherein the second transducer operates according to a piezoelectric principle.

9. The record player with a tracking tone arm for the tracking of record disks according to claim 6 wherein the record transducer is employed for generating longitudinal motion signals; and further comprising rectifying means for separating the direct current part of a generated longitudinal motion signal voltage, where the direct current part is employed as a measure of the effectively acting stylus force of the means for tracking, since a small component of the vertically acting stylus force of the means for tracking operates in longitudinal direction as a static force component and thus provides a value representing a voltage depending on the stylus force.

10. The record player with a tracking tone arm for the tracking of record disks according to claim 6 wherein each transducer is an electromagnetically operating transducer and wherein the record player produces at least two channels of recording and further comprising an about equalized pair of coils for each channel;

a center tap at the coils which is led outwardly; and a phase coordinating switching means for separating of the useful signal voltages from the voltage generated by the motion in longitudinal direction.

11. The record player with a tracking tone arm for the tracking of record disks according to claim 1 further comprising an electronic processing circuit connected to the first transducer and to the means for determining the difference $\alpha-\beta$, said electronic processing circuit providing a uniform processing of the useful signal voltage and of the longitudinal motion voltage;

display means connected to the electronic processing circuit for providing a stabilized display of the three states $\alpha<\beta$, $\alpha=\beta$ and $\alpha>\beta$;

filter band pass means for about medium frequencies connected to an output of the electronic processing circuit;

analog to digital converter for converting an output of the filter band pass means into digital signals;

a gate having an output and connected to the analog to digital converter for combining output signals from the analog to digital converter corresponding to the useful signal voltage and to the longitudinal motion voltage, where different signal levels result depending on the angle difference $\alpha-\beta$;

an integrating circuit means connected to the output of the gate for receiving the signals with different signal levels for removing strongly fluctuating modulation frequencies in order to clearly emphasize the phase jump for the criterion $\alpha=\beta$.

12. The record player with a tracking tone arm for the tracking of record disks according to claim 1 further comprising filter band pass means having an output and connected to the means for tracking adapted for about medium frequencies;

analog to digital converter means connected to the output of the filter band pass means for converting signals to digital signals in order to achieve an independence from the modulation amplitudes by employing a similar processing of the useful signal voltage and of the longitudinal motion voltage such that even in case of interval passages of the useful signal where the voltage at the useful coil $U_S$ is equal to zero, a stabilized display of the three states $\alpha<\beta$, $\alpha=\beta$ and $\alpha>\beta$ is provided;

a gate having an output and connected to the output of the analog to digital converter means for providing different signal levels depending on the angle difference $\alpha-\beta$; a hold circuit having an output and connected to the output of the gate;

an integrating circuit section connected to the output of the hold circuit for removing fluctuating modulations in order to bring out the phase jump for the criterion $\alpha=\beta$.

13. A record player with a tracking tone arm for the tracking of record disks comprising a radially or tangentially tracking tone arm for tracking of tone record disks, where the predetermined vertical recorded track angle $\alpha$ is to be maintained within predetermined limits, but where the real value of the angle is in general unknown, and where the tone arm is provided with a tracking system and with a transducer, which includes elastically supported and therefore movable tracking parts;

means for determining the difference $\alpha-\beta$ of said recorded track angle $\alpha$ and of pick-up track angle $\beta$ based upon the output from said transducer and generates a voltage depending on the longitudinal motion of said tracking parts moving under the useful signal modulation and which said voltage is displayed at a display means and/or where a track angle correction is provided to the tone arm via means for correcting the pick-up track angle $\beta$.

14. The record player with a tracking tone arm for the tracking of record disks according to claim 13 further comprising a second magneto-electrical transducer for transducing of a voltage generated by detection of a longitudinal motion of the tracking system.

15. The record player with a tracking tone arm for the tracking of record disks according to claim 14 wherein the second transducer is employed for generating longitudinal motion signals; and further comprising rectifying means connected to means for determining the difference $\alpha-\beta$ of recording track angle $\alpha$ and of pick-up track angle $\beta$ for separating the direct current part of a generated longitudinal motion signal voltage, where the direct current part is employed as a measure of the effectively acting stylus force of the means for tracking, since a small component of the vertically acting stylus force of the means for tracking operates in longitudinal direction as a static force component and thus provides a value representing a voltage depending on the stylus force.

16. The record player with a tracking tone arm for the tracking of record disks according to claim 14 wherein the record player reproduces at least two channels of recording and wherein the transducer is an electromagnetically operating transducer and further comprising
   an about equalized pair of coils for each channel;
   a center tap at the coils which is led outwardly; and
   a phase coordinating switching means for separating of the useful signal voltages from the voltage generated by the motion in longitudinal direction.

17. The record player with a tracking tone arm for the tracking of record disks according to claim 13 further comprising
   an electronic processing circuit connected to the first transducer and to the means for determining the difference $\alpha-\beta$ providing a uniform processing of the useful signal voltage and of the longitudinal motion voltage;
   display means connected to the electronic processing circuit for providing an averaged display of the three states $\alpha<\beta$, $\alpha=\beta$ and $\alpha>\beta$;
   filter band pass means for about medium frequencies connected to an output of the electronic processing circuit;
   analog to digital converter for converting an output of the filter band pass means into digital signals;
   a gate having an output and connected to the analog to digital converter for combining output signals from the analog to digital converter corresponding to the useful signal voltage and to the longitudinal motion voltage, where different signal levels result depending on the angle difference $\alpha-\beta$;
   an integrating circuit means connected to the output of the gate for receiving the signals with different signal levels for removing strongly fluctuating modulation frequencies in order to clearly emphasize the phase jump for the criterion $\alpha=\beta$.

18. The record player with a tracking tone arm for the tracking of record disks according to claim 13 further comprising
   filter band pass means having an output and input connected to said transducer;
   analog to digital converter means connected to the output of the filter band pass means for converting signals to digital signals in order to achieve an independence from the modulation amplitudes by employing a similar processing of the useful signal voltage and of the longitudinal motion voltage such that even in case of interval passages of the useful signal where the voltage at the useful signal coil $U_S$ is equal to zero a stabilized display of the three states $\alpha<\beta$, $\alpha=\beta$ and $\alpha>\beta$ is provided;
   a gate having an output and connected to the output of at the analog to digital converter means for providing different signal levels depending on the angle difference $\alpha-\beta$;
   a hold circuit having an output and connected to the output of the gate;
   an integrating circuit section connected to the output of the hold circuit for removing fluctuating modulations in order to bring out the phase jump for the criterion $\alpha=\beta$.

19. A method for tracking of sound signals on a record disk with a radially or tangentially sensing tone arm comprising
   generating a signal voltage which depends on the longitudinal motion of pick-up elements moved during useful modulation,
   determining the difference $\alpha-\beta$ of recorded track angle $\alpha$ and scanning track angle $\beta$, where the predetermined vertical recorded track angle $\alpha$ is to be maintained according to a recording specification within predetermined limits, where however the absolute value of $\alpha$ is in general unknown based upon said generated signal voltage generating a difference $\alpha-\beta$ signal with electronic means connected to the pick-up elements; and employing said signal difference $\alpha-\beta$ to enable a correction of the angle.

20. A method for tracking of sound signals on a record disk according to claim 19 further comprising
   filtering an output of the electronic processing circuit in a band pass means for about medium frequencies connected to an output of the electronic processing circuit;
   converting an output of the filter band pass means into digital signals in an analog to digital converter;
   combining output signals from the analog to digital converter corresponding to the useful signal voltage and to the longitudinal motion voltage in a gate having an output and connected to the analog to digital converter, where different signal levels result depending on the angle difference $\alpha-\beta$;
   integrating the signals with different signal levels in an integrating circuit means connected to the output of the gate for removing strongly fluctuating modulation frequencies in order to clearly emphasize the phase jump for the criterion $\alpha=\beta$,
   uniformly processing the useful signal voltage and the longitudinal motion voltage in an electronic processing circuit connected to the transducer and to the means for determining the difference $\alpha-\beta$ for providing a stabilized display to a display means of the three states $\alpha<\beta$, $\alpha=\beta$ and $\alpha>\beta$.

* * * * *